(12) United States Patent
Wang et al.

(10) Patent No.: US 7,603,267 B2
(45) Date of Patent: Oct. 13, 2009

(54) RULES-BASED GRAMMAR FOR SLOTS AND STATISTICAL MODEL FOR PRETERMINALS IN NATURAL LANGUAGE UNDERSTANDING SYSTEM

(75) Inventors: Yi-Yi Wang, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 10/427,604

(22) Filed: May 1, 2003

(65) Prior Publication Data
US 2004/0220797 A1  Nov. 4, 2004

(51) Int. Cl.
G10L 19/06 (2006.01)
(52) U.S. Cl. .................. 704/9; 704/7; 704/257
(58) Field of Classification Search ........... 704/9
See application file for complete search history.

(56) References Cited

U.S. PATENT DOCUMENTS

| | | | |
|---|---|---|---|
| 6,052,483 A | 4/2000 | Baird et al. | 382/190 |
| 6,629,066 B1 * | 9/2003 | Jackson et al. | 704/9 |
| 6,952,666 B1 | 10/2005 | Weise | 704/9 |
| 7,184,950 B2 | 2/2007 | Weise | 704/9 |
| 2002/0040359 A1 | 4/2002 | Green et al. | 707/3 |
| 2003/0055623 A1 * | 3/2003 | Epstein et al. | 704/1 |
| 2003/0216905 A1 * | 11/2003 | Chelba et al. | 704/9 |

FOREIGN PATENT DOCUMENTS

| | | |
|---|---|---|
| WO | WO 01/93246 A | 6/2001 |
| WO | WO 01/93246 A2 | 6/2001 |
| WO | WO 01/93249 A1 | 6/2001 |

OTHER PUBLICATIONS

Combination of CFG and N-gram Modeling in Semantic Grammar Learning, by Ye-Yi Wang et al., Eurospeech Sep. 2003 Geneva. p. 2809-2812.
Combination of Statistical and Rule-based Approaches for Spoken Language Understanding by Ye-Yi Wang et al., Sep. 2002, p. 609-612.
Hidden Understanding Models of Natural Language by: Scott Miller et al., Proceedings of the 32$^{nd}$ Annual Meeting of the Association for Computational Linguistics, 1994, p. 25-32.
Concept Acquisition in Example-based Grammar Authoring by Ye-Yi Wang et al., IEEE International Conference on Acoustics, Speech and Signal Processing, Apr. 2003, p. 284-287.
Grammar Learning for Spoken Language Understanding by Ye-Yi Wang et al., IEEE Workshop on Automatic Speech Recognition and Understanding 9, Dec. 2001, p. 292-295.

(Continued)

*Primary Examiner*—Richemond Dorvil
*Assistant Examiner*—Leonard Saint Cyr
(74) *Attorney, Agent, or Firm*—Westman, Champlin & Kelly, P.A.

(57) ABSTRACT

A NLU system includes a rules-based grammar for slots in a schema and a statistical model for preterminals. A training system is also provided.

25 Claims, 13 Drawing Sheets

OTHER PUBLICATIONS

Wang Y-Y et al., Concept Acquistion in Example-Based Grammar Authoring, 2003 IEEE International Conference on Acoustics, Speech and Signal Processing. Proceedings (ICASSP) Hong Kong, Apr. 10, 2003 pp. I-284 to I-287.
Wang Y-Y et al., Evaluation of Spoken Language Grammar Learning in the ATIS Domain. 2002 IEEE International Conference on Acoustic Speech, and Signal Processing. Proceedings. (ICASSP) Orlando, FL May 13-17, 2002 pp. I-41 to I-44.
Is Word Error Rate a Good Indicator for Spoken Language Understanding Accuracy, by Ye-Yi Wang et al., 2003 IEEE.
A Unified Context-Free Grammar and N-Gram Model for Spoken Language Processing, by Ye-Yi Wang et al., 2000 IEEE.
Stochastic Automata for Language Modeling, by Giuseppe Riccardi et al. 1996 Academic Press Limited.
Chinese Office Action for Application No. 200410035225.7 dated Jan. 31, 2007.
Wang Y-Y et al., Concept Acquisition in Example-Based Grammar Authoring, 2003 IEEE International Conference on Acoustics, Speech and Signal Processing. Proceedings (ICASSP) Hong Kong, Apr. 10, 2003 pp. I-284 to I-287.
Wang Y-Y et al., Evaluation of Spoken Language Grammar Learning in the ATIS Domain. 2002 IEEE International Conference on Acoustic Speech, and Signal Processing. Proceedings. (ICASSP) Orlando, FL May 13-17, 2002 pp. I-41 to I-44.
Examination Report (European Patent Application No. 04010313.7—2218).
Xuedong Huang et al., Spoken Language Processing: A guide to Theory, Algorithm, and System Development. 2001, pp. 565-619.
Office Action for European Application No. 04 009 124.1—2218 dated Aug. 10, 2007.
Chinese Office Action for Application No. 200410043591.7 dated Jul. 10, 2009.

* cited by examiner

```
<Command type="ShowFlight">
    <slot type="Flight"/>
</command>
<object type="Flight">
    <slot type="Time" name="Depart"/>
    <slot type="Time" name="Arrival"/>
    <slot type="City" name="Depart"/>
    <slot type="City" name="Arrival"/>
</object>
```

1. <ShowFlight> → <ShowFlightCmd><ShowFlightProperties>
2. <ShowFlightProperties> → <ShowFlightProperty><Opt.><ShowFlightProperties>
3. <ShowFlightProperty> → <ShowFlightPreFlight><Flight><ShowFlightPostFlight>
4. <Flight> → <FlightProperties>
5. <FlightProperties> → <FlightProperty><Opt.><FlightProperties>
6. <FlightProperty> → <FlightPreDepartureCity><City><FlightPostDepartureCity>
7. <FlightProperty> → <FlightPreArrivalCity><City><FlightPostArrivalCity>
8. <FlightProperty> → <FlightPreDepartureTime><Time><FlightPostDepartureTime>
9. <FlightProperty> → <FlightPreArrivalTime><Time><FlightPostArrivalTime>

"Flight from Seattle to Boston"     213

<ShowFlight>                              214
    <Flight>
        <City name = "Arrival">
            <Boston>
        </City>
        <City name = "Departure">
            <Seattle>
        </City>
    </Flight>
</ShowFlight>

FIG. 2D

| Example | Possible Preterminals | |
|---|---|---|
| From | ShowFlightCmd | FlightPreDepartureCity |
| Flight from | ShowFlightCmd | FlightPreDepartureCity |
| Flight to | ShowFlightCmd | FlightPreArrivalCity |

FIG. 2F

| Possible Re-write Rule | Count | Probability | $C$ |
|---|---|---|---|
| SFCmd→ ε (empty set) | 1/2+1/3+1/3=7/6 | 7/18 | 7/10 |
| SFCmd→ from | 1/2=3/6 | 3/18 | 3/10 |
| SFCmd→ flight | 1/3+1/3=4/6 | 4/18 | ⋮ |
| SFCmd→ flight from | 1/3=2/6 | 2/18 | |
| SFCmd→ flight to | 1/3=2/6 | 2/18 | |
| FPDCity→ ε | 1/2+1/3=5/6 | 5/12 | |
| FPDCity→ from | 1/2+1/3=5/6 | 5/12 | |
| FPDCity→ flight from | 1/3=2/6 | 2/12 | |
| FPACity→ ε | 1/3=1/3 | 1/3 | |
| FPACity→ to | 1/3=1/3 | 1/3 | |
| FPACity→ flight to | 1/3=1/3 | 1/3 | |

FIG. 2G

ShowFlightCmd→ε
ShowFlightCmd→show
ShowFlightCmd→show me
ShowFlightCmd→show me the
ShowFlightCmd→show me the flight

```
<command name="NewAppt">
    <slot type="Person" name="Attendee"/>
    <slot type="Time" name="StartTime"/>
</command>
```

FIG. 7

<C_NewAppt> → <NewApptCmd> {<NewApptProperties>}
<NewApptProperties> → <NewApptProperty>
            {<NewApptProperties>}
<NewApptProperty> → <NewApptAttendeeProperty> |
            <NewApptStartTimeProperty>
<NewApptAttendeeProperty> →
    {<PreAttendee>} <Person> {<PostAttendee>}
<NewApptStartTimeProperty> →
    {<PreStartTime>} <Time> {<PostStartTime>}

FIG. 8

```
<NewAppt>
    <Attendee type="Person">Peter</Attendee>
    <StartTime type="Time">five</StartTime>
</NewAppt>
```

FIG. 9

<NewApptCmd> → new meeting
<PreAttendee> → with

FIG. 10

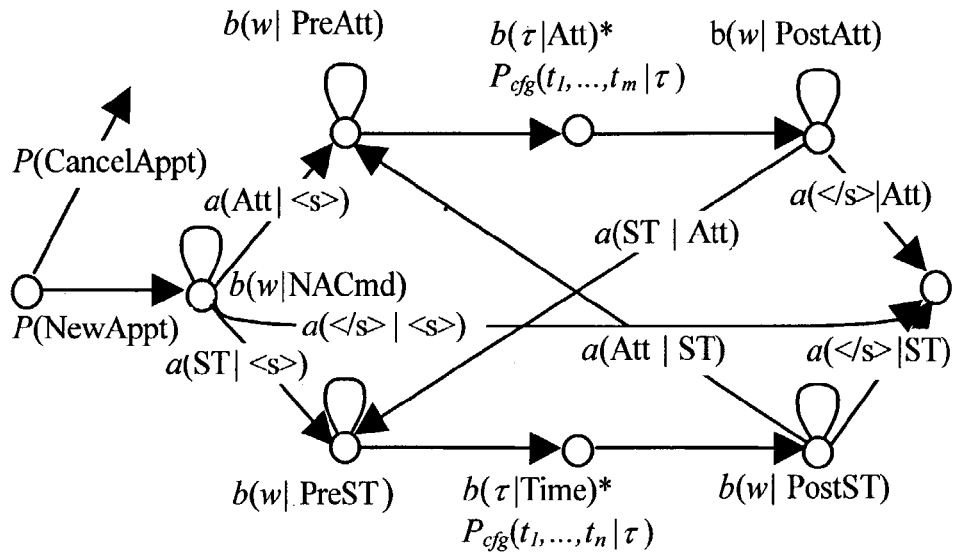

FIG. 11

```
Initialize the model λ with uniform parameterization
do {
    foreach NT→a in λ
        Compute the expected count C(NT→a) with dynamic processing
    foreach NT, set its n-gram parameters in the new model λ':
        Partition all the rules for NT into training and held-out sets;
        For the rules NT→a in the training set, train the n-gram model for
            NT using a with the expected count C(NT→a)
        Estimate the model smoothing parameters with the held-out counts
via
            deleted interpolation.
} while (Perplexity(Sample |λ) – Perplexity(Sample | λ') > threshold)
```

FIG. 12 ing system. More specifically, the present invention relates to use and authoring of an NLU system using a rules-based grammar and a statistical model.

RULES-BASED GRAMMAR FOR SLOTS AND STATISTICAL MODEL FOR PRETERMINALS IN NATURAL LANGUAGE UNDERSTANDING SYSTEM

BACKGROUND OF THE INVENTION

The present invention relates to grammar authoring. More specifically, the present invention relates to use and authoring of an NLU system using a rules-based grammar and a statistical model.

In order to facilitate the development of speech enabled applications and services, semantic-based robust understanding systems are currently under development. Such systems are widely used in conversational, research systems. However, they are not particularly practical for use by conventional developers in implementing a conversational system. To a large extent, such implementations have relied on manual development of domain-specific grammars. This task is time consuming, error prone, and requires a significant amount of expertise in the domain.

In order to advance the development of speech enabled applications and services, an example-based grammar authoring tool has been introduced. The tool is known as SGStudio and is further discussed in Y. Wang and A. Acero, *GRAMMAR LEARNING FOR SPOKEN LANGUAGE UNDERSTANDING*, IEEE Workshop on Automatic Speech Recognition and Understanding, Madonna D. Campiglio Italy, 2001; and Y. Wang and A. Acero *EVALUATION OF SPOKEN LANGUAGE GRAMMAR LEARNING IN ATIS DOMAIN*, Proceedings of ICASSP, Orlando, Fla. 2002. This tool greatly eases grammar development by taking advantage of many different sources of prior information. It also allows a regular developer, with little linguistic knowledge, to build a semantic grammar for spoken language understanding. The system facilitates the semi-automatic generation of relatively high quality semantic grammars, with a small amount of data. Further, the tool not only significantly reduces the effort involved in developing a grammar, but also improves the understanding accuracy across different domains.

However, a purely rules-based grammar in a NLU system can still lack robustness and exhibit brittleness.

SUMMARY OF THE INVENTION

A NLU system includes a rules-based grammar for slots, in a schema and a statistical model for preterminals. A training system is also provided.

BRIEF DESCRIPTION OF THE DRAWINGS

FIG. 2B illustrates an example schema.

FIG. 2C illustrates an example set of rules generated for the example schema.

FIG. 2D illustrates an example of an annotated sentence.

FIG. 2F illustrates a table of possible preterminals for words in examples.

FIG. 2G is a table of re-write rules with associated counts and probabilities.

FIG. 7 is an example of a simplified schema.

FIG. 8 is an example of a set of rules generated from the schema in FIG. 7.

FIG. 9 is an example of an annotated sentence.

FIG. 10 shows generated rules.

FIG. 11 illustrates a state diagram for a composite model.

FIG. 12 shows pseudo code describing a training technique.

DETAILED DESCRIPTION OF ILLUSTRATIVE EMBODIMENTS

The present invention deals with a natural language understanding (NLU) system. More specifically, the present invention deals with an NLU system that includes a rules-based grammar and a statistical model. Also, a training system is provided. However, prior to discussing the present invention in greater detail, one exemplary environment in which the present invention can be used will be discussed.

Figure 1:
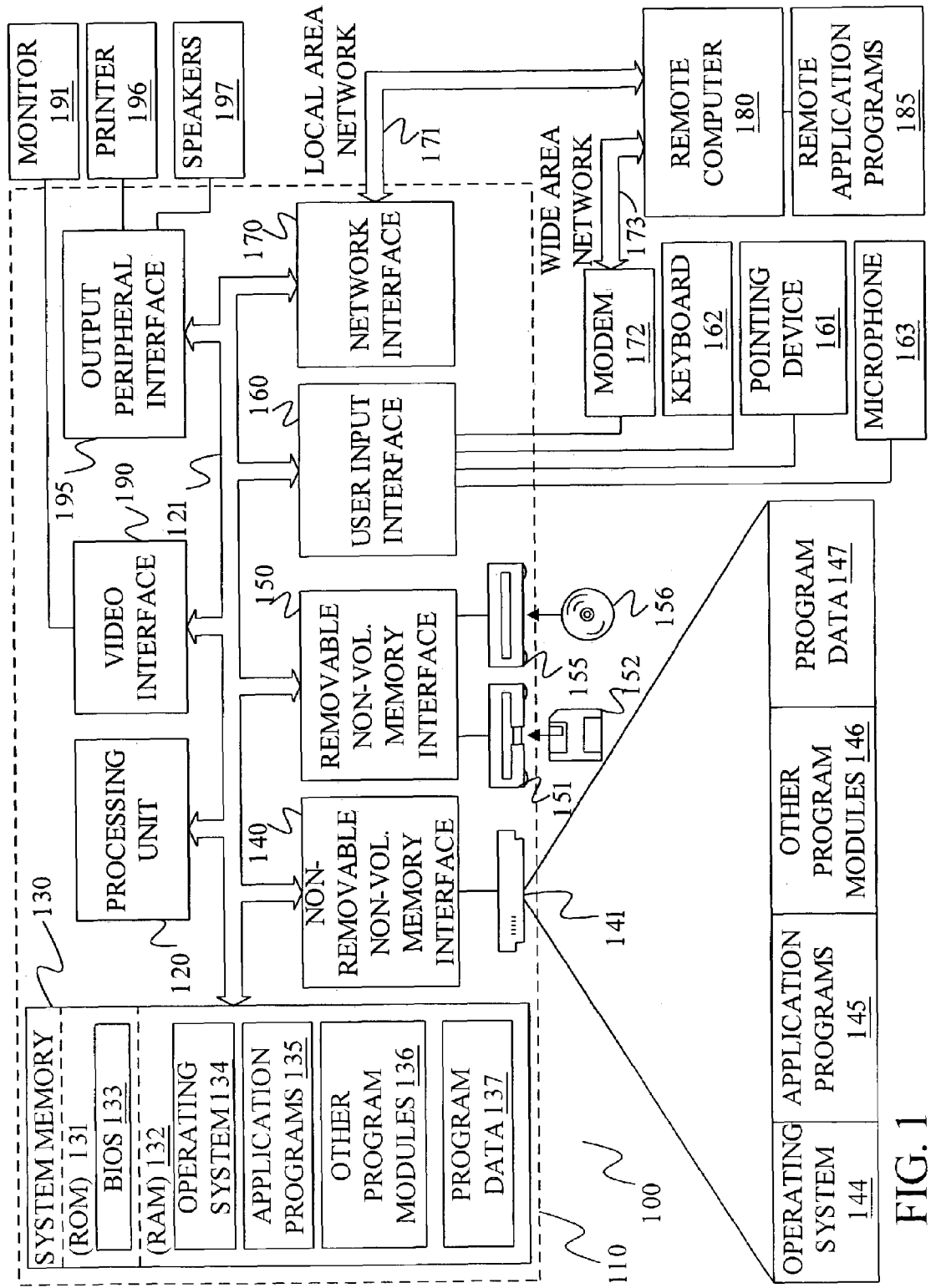
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2A:
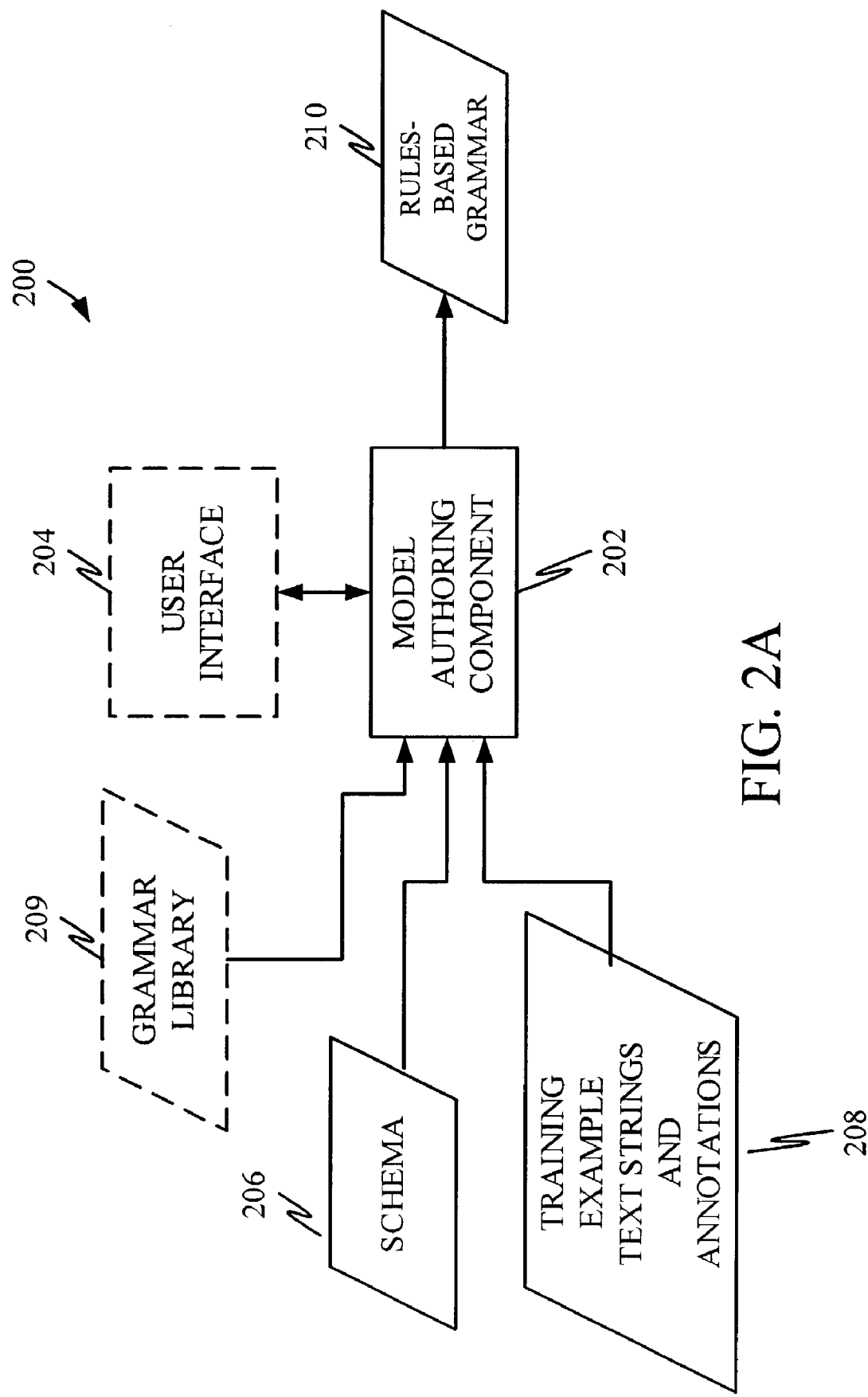
FIG. 2A is a block diagram of one embodiment of a model-authoring component in accordance with one embodiment of the present invention.

FIG. 2A is a block diagram of a model authoring system 200 in accordance with one embodiment of the present invention. Model authoring system 200 includes model authoring component 202 and an optional user interface 204. FIG. 2A also shows that model authoring component 202 receives, as an input, a schema 206, a set of training example text strings 208, an optional grammar library 209, and outputs a rules-based grammar (such as a context free grammar or CFG) 210. The optional grammar library 209 includes definitions for domain-independent concepts such as date and time as well as domain dependent concepts such as city names, airlines, etc. that can be obtained from an application database.

The detailed operation of system 200 is described at greater length below. Briefly, however, a user provides model authoring component 202 with schema 206 and training example text strings 208. This can be done either through optional user interface 204, or through some other user input mechanism, or through automated means. Model authoring component 202 receives the inputs and generates a rules-based grammar 210 based on the inputs. One example of a rules-based grammar is a context free grammar (or CFG) that allows a computer to map an input to a semantic representation of text.

Schema 206 is illustratively a semantic description of the domain being modeled. One illustration of a schema is shown in FIG. 2B. FIG. 2B illustrates a greatly simplified schema 212 that can be input into system 200, by a developer. Schema 212 is a schema that represents the meaning of various text strings for an input from a user to show flights departing from and arriving to different cities and having different departure and arrival times. Schema 212 indicates that the show flight command (ShowFlight) includes a semantic class for Flight as a slot. Schema 212 also illustrates the semantic class for Flight in greater detail indicating that it has four slots that correspond to a departure time, an arrival time, a departure city and an arrival city.

From schema 212, model authoring component 202 can generate a set of rules illustrated in FIG. 2C. Rule one shows that a ShowFlight sentence will always have a command portion ShowFlightCmd which will be followed by a properties portion ShowFlightProperties.

Rule two indicates that the ShowFlightProperties portion can have one or more properties in it. For example, rule two indicates that the ShowFlightProperties portion includes at least one ShowFlightProperty which can be followed by an optional ShowFlightProperties portion. This recursive definition of ShowFlightProperties simplifies its expression and allows it to have one or more properties.

Rule three shows that the ShowFlightProperty portion includes a ShowFlightPreFlight portion, a Flight portion, and a ShowFlightPostFlight portion. This indicates that the slot Flight in the schema can have both a preamble and a postamble.

The fourth rule indicates that the object Flight in the schema does not have a command portion, but only has a properties portion (FlightProperties), because Flight is an object in the schema while ShowFlight is a command. Rule five shows that the FlightProperties portion is again recursively defined to include at least one FlightProperty followed by an optional FlightProperties.

Rules six-nine correspond to the four slots in schema 212 shown in FIG. 2B. Rule six defines the first property as having a departure city slot that is preceded by a preamble (FlightPreDepartureCity) and is followed by a postamble (FlightPostDepartureCity). Rule seven defines the arrival city in the same way, and rules eight and nine define the departure time and arrival time in a similar fashion, respectively.

Even given the fact that all of the rules identified in FIG. 2C can be automatically generated from schema 212 by model authoring component 202, there are still no rewrite rules that indicate what specific words are actually mapped to the specific pre-terminals (command for a command semantic class, as well as preambles and postambles for slots.) For example, there is no rule which would indicate that the phrase "please show me the flights . . . " is mapped to the ShowFlightCmd. Similarly, there is no rewrite rule which indicates which words would specifically map to, for example, the FlightPreArrivalCity preamble, etc. Therefore, the developer also inputs training example text strings and annotations 208 such that model authoring component 202 can learn these rewrite rules as well.

FIG. 2D illustrates one example of an example text string 213 "Flight from Seattle to Boston" along with a semantic annotation 214 that corresponds to text string 213. Semantic annotation 214 is provided by the developer and indicates the semantic meaning of string 213. Semantic annotation 214, for example, shows that the input text string 213 corresponds to a ShowFlight command that has a slot Flight which itself has two slots, both of which are cities. The distinction between the two slots in the Flight slot is made only by the name of the slot. One is referred to as the "Arrival" city and the other is referred to as the "Departure" city. Semantic annotation 214 also maps the word "Boston" to the "Arrival" city slot and the word "Seattle" to the "Departure" city slot. Therefore, based on the annotation 214, model authoring component 202 will know which slots map to the words "Seattle" and "Boston".

Figure 2E:
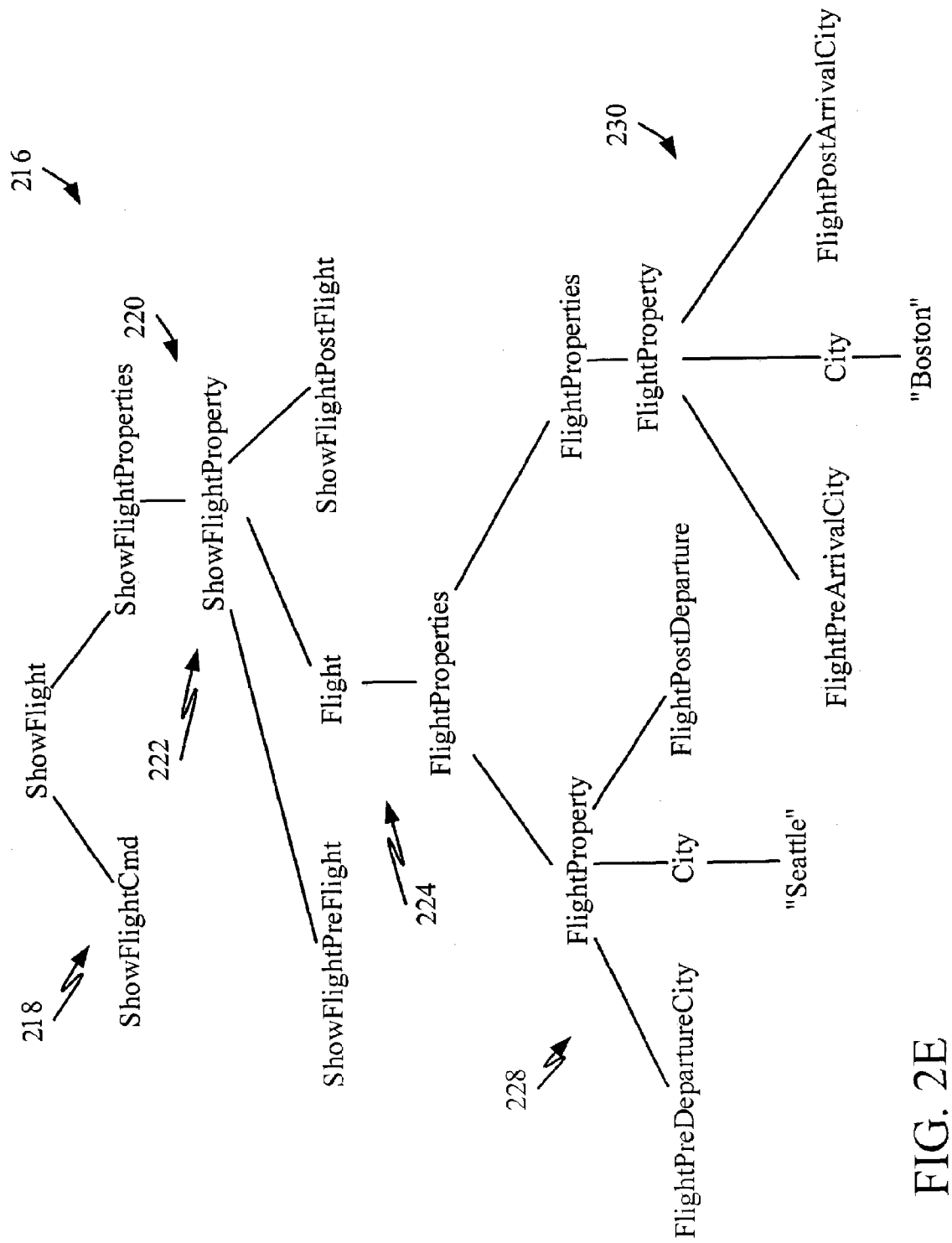
FIG. 2E illustrates an example parse tree.

From the annotated example and the template grammar rules shown in FIG. 2C, model authoring component 202 can generate a rules-based grammar (or CFG) parse tree, such as parse tree 216 illustrated in FIG. 2E. The first level 218 of parse tree 216 (the portion that shows that ShowFlight is formed of ShowFlightCmd followed by ShowFlightProperties) is formed from rule 1 in FIG. 2C.

The second level 220 (the portion indicating that ShowFlightProperties is formed of ShowFlightProperty) is generated from rule 2 where the optional ShowFlightProperties protion is not used.

The next level 222 (the portion indicating that ShowFlightProperty is formed of ShowFlightPreFlight followed by Flight followed by ShowFlightPostFlight) is generated from rule 3 in FIG. 2C.

The next level 224 (indicating that the Flight object is formed of a FlightProperties section) is generated from rule 4 in FIG. 2C.

The next level 226 (the portion indicating that the FlightProperties portion is formed of a FlightProperty portion followed by a FlightProperties portion) is generated from rule 5 in FIG. 2C.

The next level 228 (the level indicating that the FlightProperty portion is formed of a FlightPreDepartureCity portion followed by a City slot followed by a FlightPostDepartureCity postamble) is generated from rule 6, and the next level 230 (the level showing that FlightProperties is formed of a FlightPreArrivalCity preamble, a City slot and a FlightPostArrivalCity postamble) is generated from rule 7.

Finally, the level indicating that the word "Seattle" is mapped to the City slot under level 228 and that the word "Boston" is mapped to the City slot under level 230 are generated from the semantic annotation 214 which is also input by the user. Thus, model authoring component 202 can learn how to map from the words "Seattle" and "Boston" in the input sentence into the CFG parse tree and into the rules generated in FIG. 2C. It should be noted that city rules can also be obtained from a library grammar (which in turn can be constructed by taking the data from the domain-specific database) instead of annotated data.

However, there are still a number of words in the input sentence which are not yet mapped to the tree. Those words include "Flight", "from", and "to". Since the words "Flight" and "from" precede the word "Seattle", they can map to a variety of preterminals in parse tree 216, including FlightCmd, ShowFlightPreFlight, and FlightPreDepartureCity. Similarly, since the word "to" resides between the words "Seattle" and "Boston" in input text string 213, the word "to" can map to either FlighPostDepatureCity or FlightPreArrivalCity.

Since it is known that the word "to" is a preposition, it must modify what comes after it. Therefore, it can be determined that the word "to" maps to the FlightPreArrivalCity perterminal in parse tree 216.

However, it is still unknown where the words "Flight" and "from" should reside in parse tree 216. Also, the particular segmentation for the two words is unknown. For example, in one alternative, the word "Flight" can be mapped to ShowFlightCmd while the word "from" is mapped to ShowFlightPreFlight. In that case, the preterminal FlightPreDepatureCity is mapped to an empty set.

In accordance with another alternative, both words "Flight" and "from" are mapped to ShowFlightCmd while the other preterminals ShowFlightPreFlight and FlightPreDepartureCity are both mapped to empty sets.

In still another alternative, "Flight" is mapped to ShowFlightCmd and "from" is mapped to FlightPreDepartureCity, while the remaining preterminal ShowFlightPreFlight is mapped to an empty set.

This represents a segmentation ambiguity which historically has not been resolved in the absence of additional information from the developer. In some prior systems, each of the possible segmentations was simply displayed to the user, and the user was allowed to choose one of those segmentations.

However, this has resulted in a number of problems. First, this type of interaction with the user is intrusive and time consuming. Also, when there are more possible preterminals, and more unaligned words in the input text string, the number of possibilities which must be presented to the user rises dramatically. It is very difficult, if not impossible, to effectively display all such candidate segmentations for selection by the user. In addition, even when the segmentations were adequately displayed for selection by the user, user's often make errors in the segmentation or segment similar text strings inconsistently.

In accordance with one embodiment the expectation maximization (EM) algorithm is applied to segmentation ambiguities in model component 202 in order to disambiguate the segmentation choices. The EM algorithm, in general, is an algorithm for estimating model parameters with maximum likelihood estimator when the model contains unobservable hidden variables.

Figure 3A:
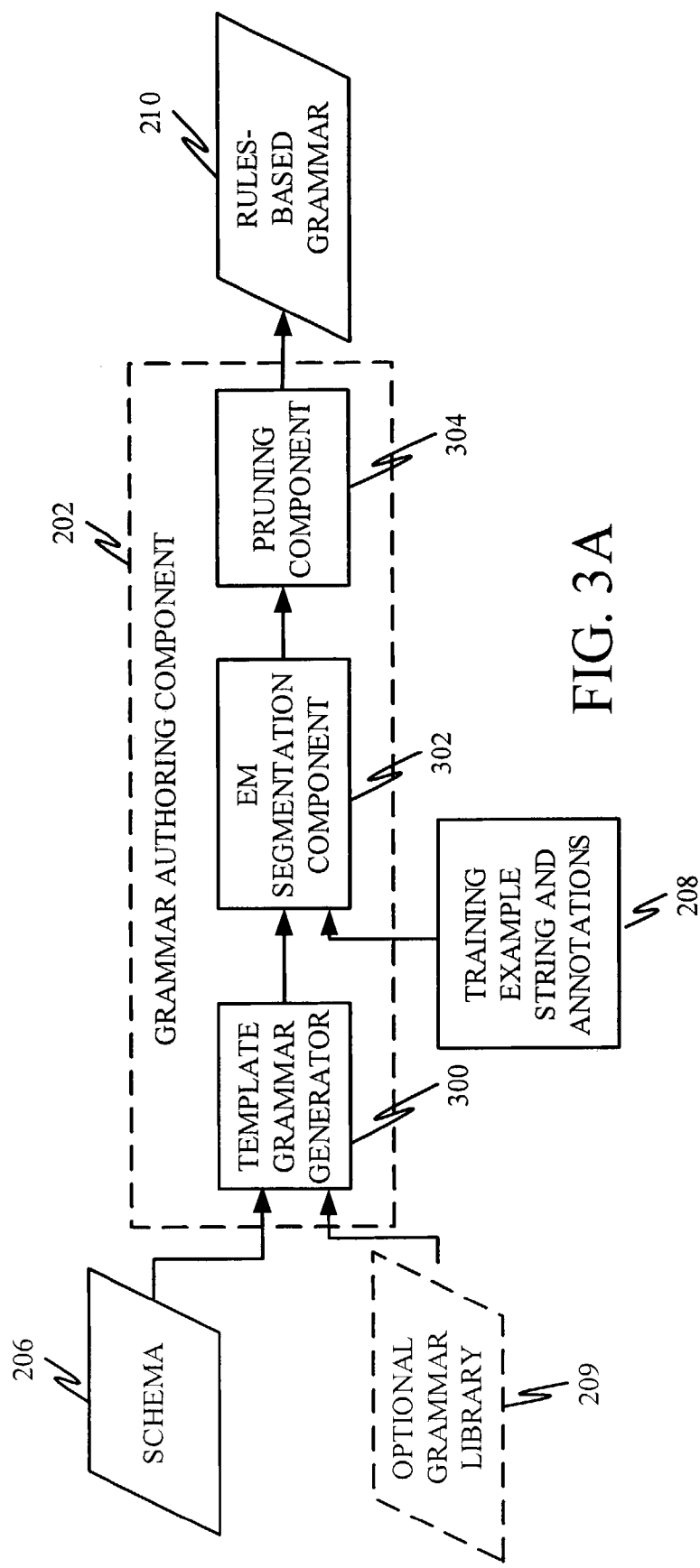
FIG. 3A is a block diagram showing a grammar authoring component in greater detail.

FIG. 3A shows a block diagram illustrating model authoring component 202 in greater detail. FIG. 3A shows that model authoring component 202 illustratively includes template grammar generator 300, segmentation EM application component 302 and pruning component 304. Template grammar generator 300 receives schema 206 and any rules in optional grammar library 209 referred to (through proper type unification) by semantic classes in schema 206 and generates a template grammar which includes all rules that can be learned or gleaned from schema 206 and optional grammar library 209. The template grammar is then taken by the EM segmentation component as an input, together with the training examples (text strings and their annotations.) The EM segmentation component 302 uses the template grammar to find the segmentation ambiguities in the training examples. Component 302 then operates to disambiguate any segmentation ambiguities. Based on that disambiguation, rewrite rules can be pruned from the grammar using pruning component 304 to provide the rules-based grammar 210.

To further illustrate the operation of EM segmentation component 302, FIGS. 2F and 2G provide exemplary tables. FIG. 2F shows a table that includes a set of examples. The first of which shows that the word "from" can possibly map to either the preterminal ShowFlightCmd or the perterminal FlightPreDepartureCity. The example may be harvested by component 302 from an example sentence like "from Seattle to Boston". The second example indicates that the words "Flight from" can be mapped to preterminals "ShowFlightCmd and FlightPreDepatureCity. The example may be harvested by component 302 from an example sentence like "Flight from Seattle to Boston". The third example illustrates that the words "Flight to" can be mapped to the preterminals ShowFlightCmd and FlightPreArrivalCity, which can be similarly obtained by component 302 from an example like "Flight to Boston on Tuesday". However, the segmentation of the examples is ambiguous. In other words, it is not yet known whether the word "from" in the first example is to be mapped to the preterminal ShowFlightCmd or to the preterminal FlightPreDepatureCity. Similarly, it is not known how the words "Flight from" are to be mapped between the preterminals ShowFlightCmd and FlightPreDepatureCity. Additionally, of course, it is not known how the words "Flight to" are to be mapped between the possible preterminals ShowFlightCmd and FlightPreArrivalCity.

Figure 3B:
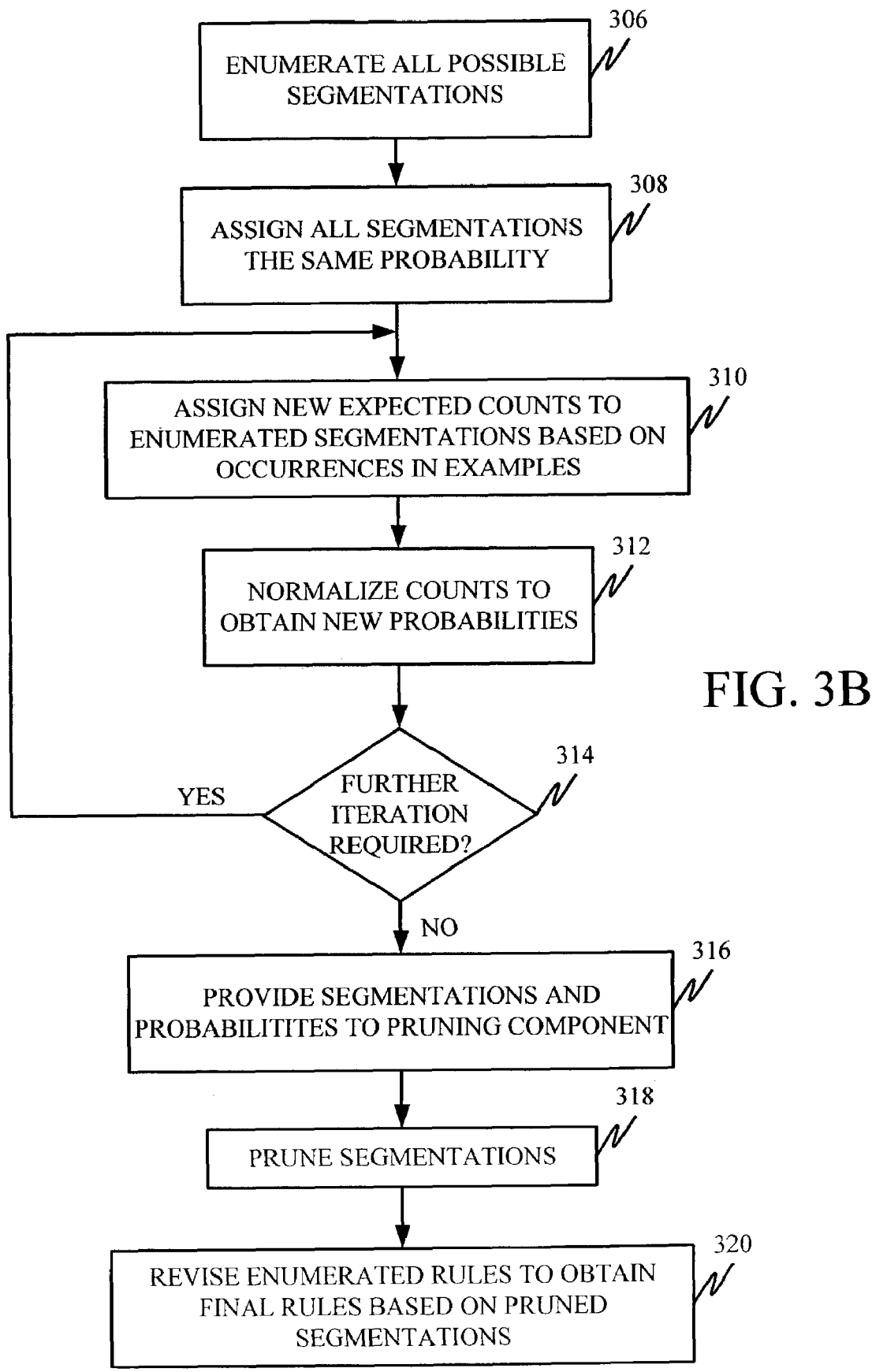
FIG. 3B is a flow diagram illustrating the operation of the grammar-authoring component shown in FIG. 3A.

FIG. 2G is a table further illustrating the operation of the EM algorithm application component 203. FIG. 3B is a flow diagram illustrating the operation of component 203 and will be described along with FIGS. 2F and 2G.

First, component 302 enumerates all possible segmentations. This is shown in the left column of FIG. 2G labeled possible re-write rules. In the re-write rules shown in FIG. 2G, some of the words that form the preterminal names are abbreviated. Therefore, by way of example, the re-write rule SFCmd→ε indicates the segmentation in which the ShowFlightCmd (abbreviated SFCmd) preterminal is mapped to an empty set. Similarly, the rewrite rules SFCmd→from represents the segmentation in which the word "from" is mapped to the preterminal ShowFlightCmd. Further, FPDCity→ε represents the segmentation in which the preterminal FlightPreDepartureCity (abbreviated FPDCity) is mapped to the empty set, and FPACity→ε represents the segmentation in which the preterminal FlightPreArrivalCity (abbreviated FPACity) is mapped to the empty set. From these examples, the other notation in the re-write rule portion of the table shown in FIG. 2G is self explanatory. Suffice it to say that each possible segmentation for the examples shown in FIG. 2F is enumerated.

From the first example in FIG. 2F, one segmentation indicates that the word "from" is mapped to ShowFlightCmd and another segmentation indicates that the word "from" is mapped to FlightPreDepatureCity.

The second example in FIG. 2F supports a number of different segmentation alternatives as well. For example, in accordance with one segmentation alternative, the words "Flight from" are both mapped to the perterminal ShowFlightCmd and the preterminal FlightPreDepatureCity is mapped to ε. In another segmentation alternative, the words "Flight from" are both mapped to the preterminal FlightPre- DepatureCity and the preterminal "ShowFlightCmd" is mapped to ϵ. In yet another alternative, the words "Flight" and "from" are split such that the word "Flight" is mapped to the preterminal ShowFlightCmd and the word "from" is mapped to the preterminal FlightPreDepartureCity. Each of these segmentations is also shown in the rewrite rules enumerated in FIG. 2G.

The third example can be segmented in a similar way to the second example in that the words "Flight to" can be mapped to either the preterminal ShowFlightCmd or the preterminal FlightPreArrivalCity while the other preterminal is mapped to ϵ, or the words "Flight to" can be split between the preterminals ShowFlightCmd and FlightPreArrivalCity. Again, each of these segmentations is represented in the rewrite rules shown in FIG. 2G.

Enumeration of all possible segmentations is indicated by block 306 in the flow diagram of FIG. 3B.

Once the rewrite rules that support the segmentations are enumerated, they are each assigned a probability. Initially, all segmentations illustrated in FIG. 2G are assigned the same probability. This is indicated by block 308 in FIG. 3B.

Next, component 302 assigns new expected counts to the enumerated rewrite rules, based upon the possible occurrences of those counts in the examples shown in FIG. 2F. This is indicated by block 310. For instance, from the first example, there are two possible segmentations, one which maps the word "from" to ShowFlightCmd and maps the preterminal FlightPreDepartureCity to ϵ, and the other of which maps ShowFlightCmd to ϵ and maps the word "from" to the preterminal FlightPreDepartureCity. The first rewrite rule says that the ShowFlightCmd preterminal maps to ϵ (the empty set) Therefore, half of the segmentations in example 1 support the first rewrite rule shown in the table of FIG. 2G. Thus, from the first example, the first rewrite rule (ShowFlightCmd→ϵ) is assigned a count of one half.

As discussed above, the second example supports three different segmentations, one of which assigns both words "Flight from" to the preterminal ShowFlightCmd and the preterminal FlightPreDepartureCity to ϵ, another of which maps the word "Flight" to the preterminal ShowFlightCmd and the word "from" to the preterminal FlightPreDepartureCity, and the last of which maps the preterminal ShowFlightCmd to ϵ and both words "Flight from" to the preterminal FlightPreDepartureCity. Of those three segmentations, one supports the first rewrite rule (SFCmd→ϵ). Therefore, from the second example, the first rewrite rule is assigned a count of one third.

In the same way, the third example has three possible segmentations, one of which maps the preterminal ShowFlightCmd to ϵ. Therefore, from the third example, the first rewrite rule shown in FIG. 2G is again assigned a count of one third.

Using this type of analysis, it can be seen that the second rewrite rule (SFCmd→from) is only supported by the first example. Therefore, since there are two possible segmentations for the first example, and one of them supports the second rewrite rule, the second rewrite rule (SFCmd→from) is assigned a count of one half.

The third rewrite rule (SFCmd→Flight) is supported by one of the segmentations from each of the second and third examples shown in FIG. 2F. Therefore, since each of those examples has three possible segmentations, the third rewrite rule (SFCmd→Flight) is assigned a count of one third from each example.

Component 302 assigns counts to each of the enumerated rewrite rules in FIG. 2G in this way, and those counts are illustrated in the second column of the table shown in FIG. 2G. The counts are all converted such that they have a common denominator, and they are then normalized for each preterminal to get the probability. In other words, the total probability mass for the ShowFlightCmd terminal must add to one. Therefore, the counts for each rewrite rule are multiplied by a normalization factor in order to obtain a probability associated with that rewrite rule.

For example, it can be seen that the total number of counts for the preterminal ShowFlightCmd is 3. Therefore, the probability of the first rewrite rule (SFCmd→ϵ) is 7/18. Similarly, the probability for the second rewrite rule (SFCmd→from) is 3/18, etc. Component 302 processes the counts for each rewrite rule, and each preterminal, in order to obtain this probability.

It can thus be seen that, for the preterminal FPDCity, the sum of the counts over all different rules is 2, therefore the normalization factor is ½. For the final preterminal FPACity, there is only one count (3*⅓=1), and therefore the normalization factor is one. It can thus be seen that component 302 resets the probability associated with each rewrite rule to one which more accurately reflects the occurrences of the rewrite rule supported by the examples. Normalizing the counts to obtain the new probability is indicated by block 312 in FIG. 3B.

Component 302 iterates on this process (re-estimating the counts and obtaining new probabilities) until the counts and probabilities converge. This is indicated by block 314. For instance, in order to obtain a new $\overline{C}$ for the first rewrite rule, component 302 implements equation 1 that first find the total likelihood of observing the word "from" given the non-terminal sequence ShowFlightCmd and FPDCity as follows:

$$P(\text{from}|\text{ShowFlightCmd FPDCity}) = \\ P(\epsilon|\text{ShowFlightCmd}) * P(\text{from}|\text{FPDCity}) + \\ P(\text{from}|\text{ShowFlightCmd}) * P(\epsilon|\text{FPDCity}) = [(7/18) \times (5/12)] + [(3/18) \times (5/12)] = 50/216 \quad \text{Eq. 1}$$

Out of this amount, the proportion for the segmentation that aligns the empty string to ShowFlightCmd and "from" to FPDCity becomes the new expected count $\overline{C}$:

$$\overline{C}(\varepsilon | cmd) = \frac{P(\varepsilon | cmd) * P(\text{from}| FPDCity)}{P(\text{from}| cmd\ FPDCity)} \quad \text{Eq. 2}$$

$$= \frac{\frac{7}{18} \times \frac{5}{12}}{\frac{50}{216}} = \frac{\frac{35}{216}}{\frac{50}{216}} = \frac{35}{50} = \frac{7}{10}$$

Similarly, the new $\overline{C}$ for the second rewrite rule (SFCmd→from) is computed as follows:

$$\overline{C}(\text{from}| cmd) = \frac{P(\text{from}| cmd) * P(\varepsilon | FPDCity)}{P(\text{from}| cmd\ FDPCity)} \quad \text{Eq. 3}$$

$$= \frac{\frac{3}{18} \times \frac{5}{12}}{\frac{50}{216}} = \frac{\frac{15}{216}}{\frac{50}{216}} = \frac{3}{10}$$

This process is continued for each of the rewrite rules to collect the counts $\overline{C}$ from each example. Then, the new counts are multiplied by the normalization factor to obtain the new probabilities. As shown in FIG. 3B, component 302 iterates on this process, re-estimating the new counts and the new probabilities until the probabilities converge.

Once the iteration is complete, component 302 will have computed a new count and new probability associated with each of the enumerated rewrite rules. While this, in and of itself, is very helpful, because it has assigned a probability to each of the segmentations to the rules corresponding to the different segmentations obtained during training, it may not be a desired final result. For example, some parsers are unable to take advantage of probabilities. Also, in some parsing components, a large number of rules render the parser less effective.

Thus, in accordance with one illustrative embodiment, component 302 provides the rules and associated probabilities to pruning component 304 where the rules can be pruned. This is indicated by blocks 316 and 318 in FIG. 3B. Pruning component 304 can prune the rules (as indicated by block 320) in one of a number of different ways. For example, pruning component 304 can simply prune out rules that have a probability below a desired threshold level. Component 304 then introduces the remaining rules into the rules-based grammar 210.

In accordance with another illustrative embodiment, pruning component 304 eliminates all but a predetermined number of segmentations with high likelihood corresponding to each example, and only introduce rewrite rules to the grammar according to the remaining segmentations. For instances, component 304 may eliminate all the segmentations corresponding to each example but the one that has the highest probability. Thus, for example 1, assume that the segmentation that mapped the word "from" to the preterminal Flight-PreDepartureCity had a higher probability than the segmentation which assigned the word "from" to the preterminal ShowFlightCmd. In that instance, the second segmentation (the one which mapped "from" to ShowFlightCmd) is eliminated. In that case, the two rewrite rules that support the chosen segmentation are added to the grammar. Therefore, the rewrite rule "SFCmd→ϵ" and the rewrite rule "FPDCity→from" are both added to the grammar.

Similarly, rules which are no longer supported by the best segmentation of any examples can be removed from the enumerated rules shown in FIG. 2G. Thus, the rule "SFCmd→from" can be removed, since it was only supported by the segmentation for example 1 that has been eliminated.

Application of the EM algorithm in this way is now described in more formal mathematical terms. Segmentation ambiguity resolution can be formalized as the problem of finding an m block partition $\pi = \alpha_1, \alpha_2, \ldots, \alpha_m$ for the word sequence $w = w_1, w_2, \ldots, w_n$, such that each block aligns to a pre-terminal in the sequence $N = NT_1, NT_2, \ldots, NT_m$. A block may contain 0 or more words from w.

If we model the joint probability of π, N and w with $$P(\pi, N, w) = \prod_{i=1}^{m} P(NT_i \to \alpha_i) \quad \text{Eq. 4}$$

Then given N and w, the most likely segmentation can be obtained as:

$$\hat{\pi} = \underset{\pi}{\operatorname{argmax}} P(\pi, N, w) = \underset{\pi = \alpha_1, \ldots, \alpha_m}{\operatorname{argmax}} \prod_{i=1}^{m} p(NT_i \to \alpha_i) \quad \text{Eq. 5}$$

Such a partition can be found with Viterbi search. Thus the only problem left is to estimate the model parameter $P(NT \to \alpha)$ for every pre-terminal (or concept) NT and word sequence α. This could be done with maximum likelihood (ML) estimation if the training data is a list of pre-terminals paired with a word sequence for each pre-terminal. However, the training examples obtained form the user via the authoring tool are illustratively pairs of pre-terminal sequences and terminal sequences. The partition or segmentation is a hidden variable and unknown to the tool.

The EM algorithm initially sets the parameters $P_\phi$ for the model, and then iteratively modifies the parameters to $P_{\phi'}$, such that the likelihood of the observation D increases.

To find such $P_{\phi'}$, we define the auxiliary function Q in (6):

$$Q(P_{\phi'} | P_\phi) = \sum_{N,w} c(N, w) \sum_\pi P_\phi(\pi | N, w) \log \frac{P_{\phi'}(\pi, N, w)}{P_\phi(\pi, N, w)} \quad \text{Eq. 6}$$

It is a lower bound of $L(D|P_{\phi'}) - L(D|P_\phi)$, the log-likelihood difference of the training data between the two model parameterizations. The EM algorithm resets the parameters $P_{\phi'}$ greedily by maximizing Q to maximize the increase of training sample likelihood by the new parameterization, subject to the constraints that the probabilities of all possible rewrite rules for a pre-terminal must sum to 1. Therefore, for each rule NT α, its new probability can be obtained by solving the following equation:

$$\frac{\partial \left( Q(P_{\phi'} | P_\phi) + \lambda \left( \sum_\alpha P_{\phi'}(NT \to \alpha) - 1 \right) \right)}{\partial P_{\phi'}(NT \to \alpha)} = 0 \quad \text{Eq. 7}$$

Since $P_{\phi'}(\pi, N, w) = \prod_{NT, \alpha} P_{\phi'}(NT \to \alpha)^{c(NT \to \alpha; \pi, N, w)}$, $$\frac{\partial Q(P_{\phi'} | P_\phi)}{\partial P_{\phi'}(NT \to \alpha)} = \quad \text{Eq. 8}$$

$$\sum_{N,w} c(N, w) \sum_\pi \frac{P_\phi(N, w) c(NT \to \alpha; \pi, N, w)}{P_{\phi'}(NT \to \alpha)} = -\lambda.$$

Therefore, the probability should be reset to the expected count times the normalization factor $-1/\lambda$:

$$P_{\phi'}(NT \to \alpha) = \qquad \text{Eq. 9}$$
$$-1/\lambda \sum_{N,w} c(N, w) \sum_s P_\phi(\pi \mid N, w) c(NT \to \alpha; \pi, N, w).$$

To calculate the expected counts, note that

Eq. 10

$$\frac{\partial P_\phi(N, w)}{\partial P_\phi(NT \to \alpha)} = \frac{\partial \sum_\pi P_\phi(\pi, N, w)}{\partial P_\phi(NT \to \alpha)} \times$$

$$= \sum_\pi \frac{c(NT \to \alpha; \pi, N, w) \prod_{NT,\alpha} P_\phi(NT \to \alpha)^{c(NT \to \alpha;\pi,N,w)}}{P_\phi(NT \to \alpha)}$$

$$= \sum_\pi \frac{P_\phi(\pi, N, w) c(NT \to \alpha; \pi, N, w)}{P_\phi(NT \to \alpha)}$$

$$= P_\phi(N, w) \frac{\sum_\pi P_\phi(\pi \mid N, w) c(NT \to \alpha; \pi, N, w)}{P_\phi(NT \to \alpha)}.$$

hence $$\sum_\pi P_\phi(\pi \mid N, w) c(NT \to \alpha; \pi, N, w) = \qquad \text{Eq. 11}$$

$$\frac{P_\phi(NT \to \alpha)}{P_\phi(N, w)} \frac{\partial P_\phi(N, w)}{\partial P_\phi(NT \to \alpha)}.$$

Let $E_{ij}^k = (N \to w_1, \ldots, w_n)$ be the event that in the process of rewriting the pre-terminal sequence N to the word sequence w, the rule $NT \to \alpha$ is used for the kth pre-terminal in N to generate the sub-sequence $\alpha = w_i, \ldots, w_j$, and let $\lambda_s^t(p,q)$ be the probability that the pre-terminals from position s to t in the sequence N cover the terminal words $w_p, \ldots, w_{q=1}$. Then $$P_\phi(N, w) = \sum_{ij} E_{ij}^k \qquad \text{Eq. 12}$$
$$= \sum_{ij} \lambda_1^{k-1}(1, i) \lambda_{k+1}^m(j+1, n+1) P_\phi(NT \to w_i, \ldots, w_j)$$

$$\frac{\partial P_\phi(N, w)}{\partial P_\phi(NT_k \to \alpha)} = \sum_{ij: \alpha = w_i, \ldots, w_j} \lambda_1^{k-1}(1, i) \lambda_{k+1}^m(j+1, n+1) \qquad \text{Eq. 13}$$

Therefore if we can compute $\lambda_s^t(p,q)$, we can be combine equations (9), (11) and (13) to obtain the expected counts and reset the model parameters. In fact $\lambda_s^t(p,q)$ can be computed with dynamic programming according to (14), where $\epsilon$ is the null string:

$$\lambda_s^t(p, q) = \sum_{p \leq r \leq q} \lambda_s^{t-1}(p, r) \lambda_t^t(r, q); \qquad \text{Eq. 14}$$

$$\lambda_s^s(p, q) = \begin{cases} P_\phi(NT_s \to w_p, \ldots, w_{q-1}) & \text{if } p < q \\ P_\phi(NT_s \to \epsilon) & \text{if } p = q \end{cases};$$

Note that $P_\phi(N,w) = \lambda_l^m(1, n+1)$ can be used in equation (11).

Figure 4:
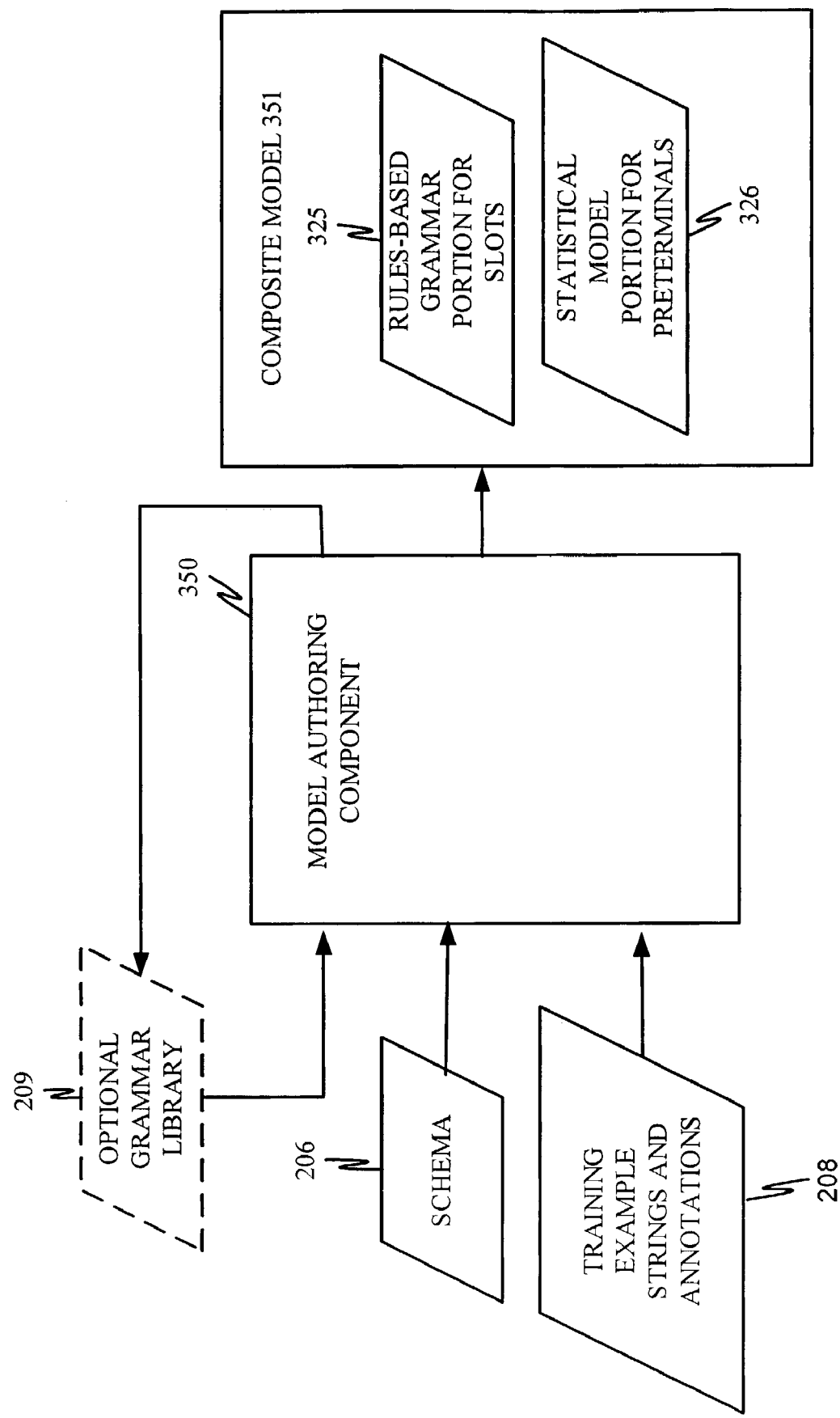
FIG. 4 illustrates a model-authoring component in accordance with another embodiment of the present invention.

FIG. 4 illustrates another embodiment of a model authoring component 350 in accordance with a different aspect of the invention. Rules-based grammar 210 can still be less robust and more brittle than desired. For example, assume, during training that the following rules are generated, to model the following pre-terminals:

FlightPreArrivalCity→to
ShowFlightCmd→Show me the flight

Further assume that, during runtime, the sentence input is "Show flight to Boston." The input sentence will not be understood because there is no rule that says that "Show flight" is a ShowFlightCmd.

A CFG works well for high resolution understanding. High resolution understanding represents grammars which break down sentences into a large number of slots. The larger the number of slots, the higher the resolution understanding is exhibited by the grammar. CFGs generalize well in high resolution situations.

However, many applications require low resolution understanding, in which there are not a large number of slots to be filled. One such application is command and control. For example, in a command and control application, some commands which must be recognized include "ChangePassword", "ChangeBackground", and "ChangeLoginPicture". In these instances, there are no slots to be filled, and entire sentences must be recognized as the commands. During training, this may well result in a rule such as:

ChangeLoginPictureCmd→Please change my login icon.

Since "ChangeLoginPicture" is a command, there is not a property portion to the rule. Therefore, the grammar learner simply "remembers" the full sentence in the rule it acquired. In order to recognize and invoke a user issued command, the command must match a full sentence in the training data. There is no generalization at all.

One embodiment of the invention is drawn to, instead of modeling preterminals (such as commands, preambles and postambles) with rules in the template grammar, a statistical model (such as an n-gram) is used to model the preterminals. In one embodiment, the text generated for the enumerated segmentations corresponding to the preterminals in the template grammar is used as training data for the n-gram (or other statistical model). Therefore, in the example above, the text string corresponding to enumerated segmentations for the preterminals, together with its expected count collected in the expectation step of the EM algorithm, is used to train an n-gram for the preterminals. Thus, the text "Show me the flight" is used as training data to train an n-gram for modeling the ShowFlightCmd preterminals. Therefore, the probability that a sentence with "Show flight" in it will be recognized as a ShowFlightCmd can be calculated as follows:

$Pr(<s>showflight</s>|ShowFlightCmd)=$
    $Pr(show|<s>; ShowFlightCmd)*Pr(flight|show;$
    $ShowFlightCmd)*Pr(</s>|flight; ShowFlight-$
    $Cmd)$ Eq. 15

While the rules would not have identified "show flight" as a ShowFlightCmd, the above n-gram probability in Eq. 15 will not be zero. The first factor and the third factor in equation 15 are nonzero because they correspond to bigrams that actually exist in the training data (i.e., [<s>show] and [flight </s>]). The second factor does not correspond to a bigram that showed up in the training data but, because of smoothing techniques like backoff (described below) it will also have a nonzero probability and can be represented as follows:

$Pr(flight|show;ShowFlightCmd)=backoff\_weight*$
    $Pr(flight|ShowFlightCmd)$ Eq. 16

The backoff weight can be set empirically or otherwise, as desired, and the unigram probability Pr(flight|ShowFlightCmd) is nonzero because "flight" is a word in the training data.

Since Pr(show flight</s>|ShowFlightCmd)>0, the parser will consider the input sentence as a ShowFlight candidate. The ultimate interpretation of the input sentence will depend on a comparison with other interpretation candidates.

FIG. 4 thus shows another embodiment of model authoring component 350 which authors a composite model 351 that includes a grammar portion 210 (such as a CFG) that includes rules for modeling the slots and statistical model portion 326 (such as an n-gram) for identifying preterminals (such as commands, preambles and postambles). Thus, during runtime, input sentences are evaluated with the statistical model portion 326 to identify preterminals, and with the rules-based grammar portion 210 to fill slots.

Component 350 trains composite model 351 using, in part, the EM algorithm techniques discussed above. For example, assume that FIG. 5 shows all enumerated rules for the ShowFlightCmd according to different sample segmentations.

Figures 5, 6:
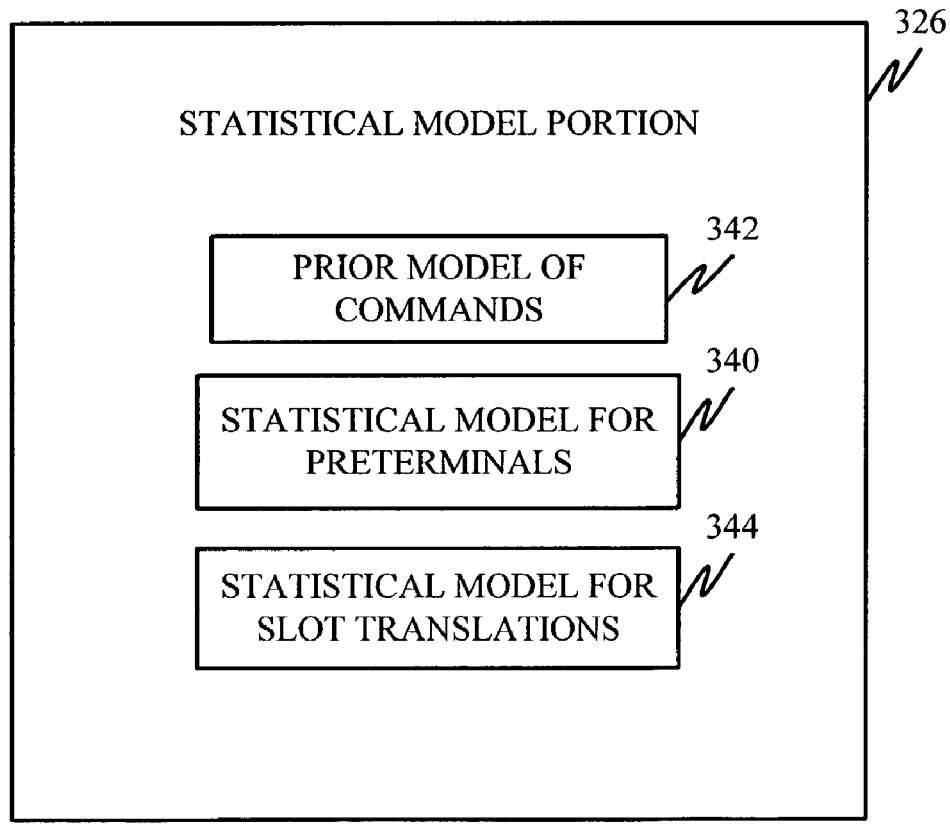
FIG. 5 shows an example of enumerated segmentations.
FIG. 6 illustrates a statistical model in greater detail in accordance with one embodiment of the present invention.

For the model discussed above with respect to FIGS. 2-3B, during the E-step of the EM algorithm, the expected counts are collected for each of the enumerated rules shown in FIG. 5. During the M-step, the counts are normalized. However, for composite model 351, instead of normalizing the counts during the M-step of the algorithm, the text strings on the right hand side of the enumerated rules and the associated expected counts corresponding to those rules are used as training data to train and smooth an n-gram for the ShowFlightCmd preterminal.

In other words, in training the n-gram, a full count need not be added for each occurrence of a word sequence. Instead, the fractional data corresponding to the expected count for the rule associated with the training sentences (generated by EM application component 302 illustrated in FIG. 3A) is added for each occurrence of the word sequence.

Another difference from the embodiment described for segmentation disambiguation with respect to FIGS. 2-3B involves the E-step of the EM algorithm. Instead of associating a probability with each of the enumerated rules, the probability of a rule is the product of all the n-grams in the rule.

For example, in the rules-based grammar discussed above, the rule:

ShowFlightCmd→Show me the flight has an atomic probability associated with it. However, in composite model 351, the probability for the rule can be computed as follows:

$$Pr(\text{ShowFlightCmd->show me the flight})= \\ Pr(\text{show}|<s>; \text{ShowFlightCmd})*Pr(\text{me}|\text{show}; \\ \text{ShowFlightCmd})*Pr(\text{the}|\text{me}; \text{ShowFlightCmd})* \\ Pr(\text{flight}|\text{the}; \text{ShowFlightCmd})*Pr(</s>|\text{flight}; \\ \text{ShowFlightCmd}). \quad \text{Eq. 17}$$

Also, in accordance with one embodiment of the present invention, training the statistical model for the preterminals includes applying a smoothing algorithm. For example, the training data for training the statistical model for preterminals may be relatively sparse, since it only includes the text strings enumerated for segmentation associated with the given preterminal. This would leave a relatively large amount of language expressions uncovered by the statistical model and would therefore render the statistical model relatively brittle. Thus, the model probabilities are smoothed using lower level n-grams and with a uniform distribution. In other words, if the statistical model comprises a bi-gram, it is smoothed with unigrams which provide probabilities for the words modeled, regardless of context. In addition, the statistical model is smoothed with a uniform distribution which assigns the same probability to each word in the vocabulary. Therefore, if the word is in the vocabulary, it will not be modeled with zero probability by the statistical model. Deleted interpolation is used to find the weight for each model in the smoothing operation and linearly interpolate the models of different orders.

Component 350 can also train additional statistical model components in accordance with different embodiments of the present invention. This is illustrated in greater detail in the block diagram shown in FIG. 6. For instance, in that block diagram, statistical model portion 326 is shown as not only including a statistical model component for preterminals 340, but also a plurality of other statistical models. For example, statistical model 326 can, in one embodiment, include components 342 and 344 which include statistical models modeling the prior probability of tasks, and a statistical model for, slot transitions.

For example, if a runtime input sentence is "Show flights to Boston arriving on Tuesday, 11:00 a.m." The term "arriving on" will be analyzed as indicating that "Tuesday" corresponds to an arrival date. However, there are no words before "11:00 a.m." to indicate whether it is a departure time or an arrival time. The probability of an "arrival time" slot following an "arrival date" slot will likely be higher than the probability of a "departure time" slot following an "arrival date" slot. If such slot transitions are modeled, the slot transition model will prefer that "11:00 a.m." be matched to the "arrival time" slot. It will also be noted that training a statistical model (such as an n-gram model) to model slot transitions is the same as training a statistical model (such as an n-gram model) to model the prior probability of slots, except that the order of n is different. For the prior probability of slots, a unigram model is trained, and to model slot transitions between two slots, a bigram model is trained, etc.

Further, some commands occur in the training data more frequently than others. Therefore, the prior probability of the commands is modeled in model 342.

The present invention will now be described in greater detail with respect to another example. FIG. 7 shows one exemplary simplified example of a semantic class in a schema that defines the semantics for an appointment scheduling command NewAppt.

FIG. 8 illustrates template rules that can be automatically generated for the semantic class NewAppt, where symbols inside braces are optional. FIG. 9 illustrates one embodiment of an annotated sentence "New meeting with Peter at 5:00". FIG. 10 illustrates two rules which can be added once segmentation disambiguation has been performed as discussed above.

However, as discussed, the purely rules-based grammar can lack robustness and exhibit brittleness. Therefore, one aspect of the present invention replaces CFG rules with an n-gram to model each of the commands, preambles and postambles in the template grammar and to model slot transitions. The slot n-gram constrains the interpretation of slots lacking preambles and postambles. The resulting model is a composite of a statistical model (or HMM) and a CFG. The HMM models the template rules and the n-gram preterminals, and the CFG models library grammar.

One example of such a model is shown in FIG. 11. The term "Att" is an abbreviation for "Attendee", and "ST" is an abbreviation for "StartTime". The emission probabilities b are preterminal-dependent n-grams (in the figure they are depicted as a unigram,but high order emission distribution will result in a high order HMM) and the transition probabilities a are the slot transition bigrams. The emissions from a slot node are library CFG non-terminals. Words are generated from them according to the CFG model $P_{CFG}$.

In the model shown in FIG. 11, the meaning of an input sentence s can be obtained by finding the Viterbi semantic class c. and the state sequence σ that satisfy:

$$(c, s) = \arg\max_{(c,s)} P(c, s \mid s)$$ Eq. 18

$$= \arg\max_{(c,s)} P(c, s, s)$$

$$= \arg\max_{(c,s)} P(c)' P(s, s \mid c)$$

The new model overcomes the limitations of a CFG model. For low resolution understanding (task classification), no property preterminals are introduced into the template grammar. Therefore, all training data are used to train and smooth the n-gram for the command preterminals. The model scales down to an n-gram classifier represented by Equation 19.

$$\hat{c} = \arg\max_{c} P(c) P(s \mid c)$$ Eq. 19

$$= \arg\max_{c} P(c) \prod_{i} P(w_i \mid w_{i-1}, w_{i-2}, \ldots, w_1; cCmd)$$

The n-gram model does not require an exact rule match. Instead of making binary decisions about rule applicability, it compares the probability that the observed word sequence is generated from a state (preterminal) sequence to find the most likely interpretation. Therefore, the model itself is robust and there is no need for a robust parser.

Training is now described in greater detail with respect to the example shown in FIGS. 7-11. To train the model, the EM algorithm automatically segments word sequences and aligns each segment α to the corresponding preterminal NT in the preterminal sequence of a corresponding pair. The EM algorithm builds a model P(NT→α) that assigns a probability for generating word string a from NT, and parameterizes it with an initial uniform distribution. It then iteratively refines the parameterization, as discussed above. In each iteration, it computes the expected count for the rule NT→α according to the parameterization of the model in the previous iteration (the E step) and then re-estimates the probability P(NT→α) by normalizing the expected counts (the M step). To train the new model that models the preterminals with n-grams, the expected counts collected in the E-step are used to train and smooth the n-grams in the M-step; and the n-grams are used by the EM algorithm to collect the expected counts for the segmentations. This results in a training algorithm illustrated in FIG. 12.

In one illustrative embodiment, the threshold value illustrated in the last line of FIG. 12 is set to 0.01. Of course, other threshold values can be used as well.

It is also worth noting another optional aspect of the invention. Optional grammar library 209 (shown in FIGS. 2A, 4 and 13) can be adapted to the training data 208 statistically. For example, assume that the grammar library 209 includes a relatively large city list that contains both large and small international and domestic cities. However, further assume that a specific application for which the models are being trained will only refer to domestic cities, and further that large domestic cities such as New York and Los Angles are more likely to be referred to than smaller cities. Component 202 or 350 learns the probabilities associated with the probabilistic context free grammar (PCFG) that can comprise grammar 209, from the annotated training data 208. It may be learned, for instance, that the probability for the rule Cityname→New York is greater than the probability for the rule Cityname→Tokyo. This can be done in the same way as the other probabilities discussed above are learned.

Figure 13:
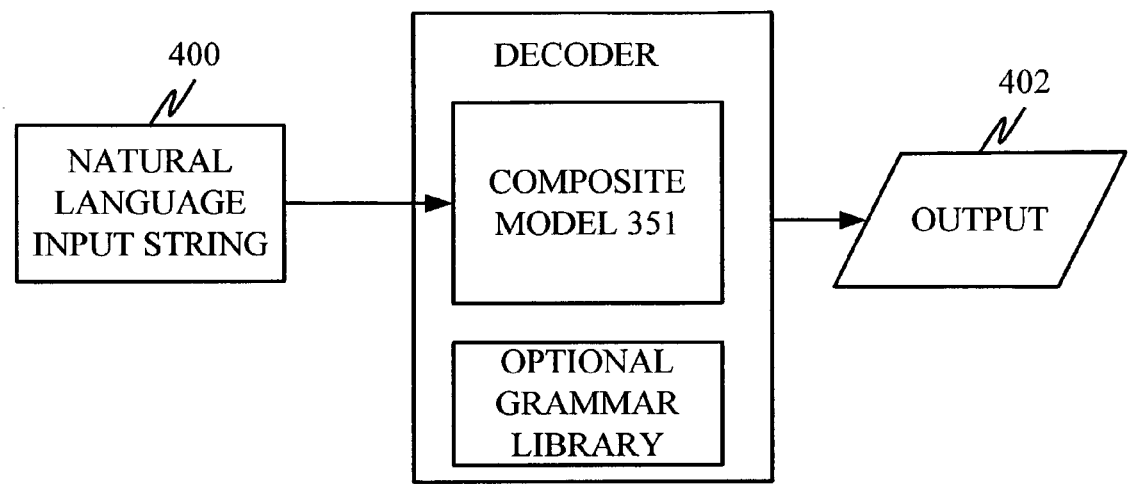
FIG. 13 is a block diagram illustrating a runtime system for using a model generated in accordance with the present invention.

FIG. 13 illustrates a runtime system using both the rules-based grammar portion for slots and the statistical model portion for preterminals. The system receives an input, and uses the grammar portion and n-gram portion and outputs an output 402.

Figure 14:
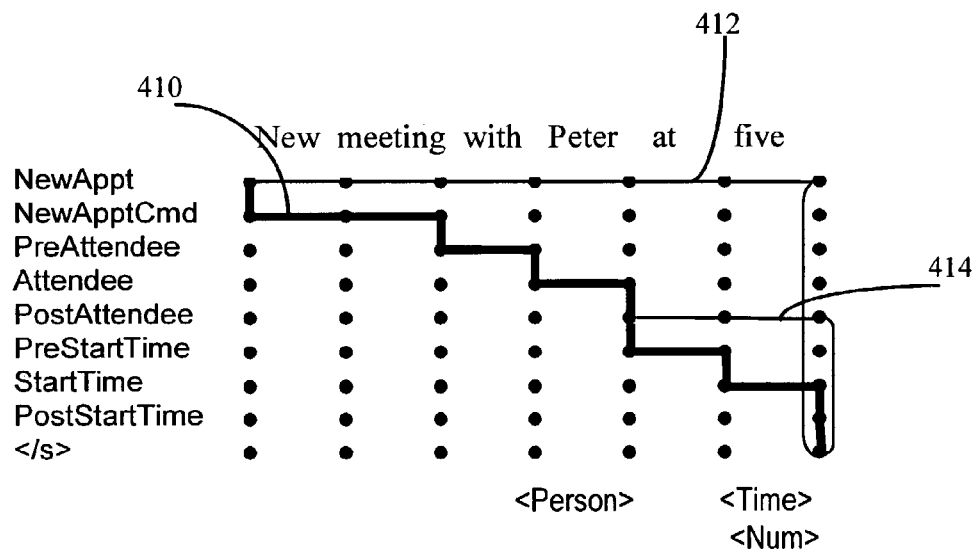
FIG. 14 illustrates an example of a decoder trellis.

Decoding is described in greater detail with respect to FIG. 14. FIG. 14 illustrates a dynamic programming trellis structure representing a dynamic programming decoder for an input "new meeting with Peter at five".

The dynamic programming decoder finds the Viterbi path represented by Equation 18 above. Upon receiving the input, the decoder first uses a bottom-up chart parser to find the library grammar non-terminals that cover some input spans. In this example, it identifies "Peter" as <Person> and "five" as either <time> or <num>. The decoder then searches through the trellis starting from the semantic class nodes at the first column (the example only shows the semantic class NewAppt). At each node, it makes transitions to other nodes in the same column (switching to a different non-terminal) or to the next node in the same row (consuming an input word by the non-terminal). The search continues from left to right until it reaches the right most column. When it makes a transition, a score is obtained by adding an appropriate log probability to the score of the starting node. The score is then compared with that of the destination node, and replaces it if the new score is higher. Below the trellis are the non-terminals identified by a chart parser. The thick path 410 represents the Viterbi interpretation. A higher thin path 412, identifies the correct tasks, but neither of the slots. A lower thin path 414 (which shares part of Viterbi path 410) identifies the attendee but not the start time slot. It treats "at five" as the postamble for the attendee. The log probability for each of the first nine transitions shown in FIG. 14 are listed below for the Viterbi path 410.

| | | |
|---|---|---|
| 1. | log P(NewAppt) | // Class Prior |
| 2. | log b(New \| <s>; NewApptCmd) | // Word bigram |
| 3. | log b(meeting \| new; NewApptCmd) | // Word bigram |
| 4. | log b(</s> \| meeting; NewApptCmd) + | // Word bigram |
| | log a( Attendee \| <s>; NewAppt) | // Slot bigram |
| 5. | log b(with \| <s>; PreAttendee) | // Word bigram |
| 6. | log b(</s> \| with; PreAttendee) | // Word bigram |
| 7. | log $P_{cfg}$(Peter\| <Person>) | // PCFG |
| 8. | 0 | |
| 9. | log b(</s> \| <s>; PostAttendee) + | // Word bigram |
| | log a( StartTime \| Attendee; NewAppt) | // Slot bigram |

Any desired pruning mechanism can be used. For example, one pruning mechanism provides that at each column of the trellis, no transition is made out of a node if its score is smaller than a threshold (such as 5.0) less then the maximum score in the same column. In other words, a path is not extended if it is $10^5$ times less likely than another that leads to a node in the same column. The decoder runs an order of magnitude faster than the robust parser after pruning.

It can thus be seen that various embodiments of the present invention not only include a statistical model portion for preterminals, but can also include a rules-based grammar portion to fill slots. The present invention can also include a model for the prior probability of tasks, and a statistical model for slot transitions. Finally, one embodiment of the present invention includes training of the statistical model using the expected counts from the E-step of the EM algorithm used in generating the rules.

Although the present invention has been described with reference to particular embodiments, workers skilled in the art will recognize that changes may be made in form and detail without departing from the spirit and scope of the invention.

What is claimed is:

1. An authoring component configured for generating components for use in mapping natural language inputs to slots and preterminals derived from a schema in a natural language understanding (NLU) system, the authoring component comprising:
a model trainer implemented using a processor of a computer, wherein
the model trainer obtains a schema indicative of a task to be completed, the schema including a plurality of slots and a plurality of preterminals configured to be filled with portions of a natural language input, the preterminals comprising at least one of a preamble and postamble associated with one or more of the slots, and wherein
the model trainer is configured to train a rules based grammar, based on training data, for mapping terms from the natural language input to slots derived from the schema and to train a plurality of statistical models for mapping terms from the natural language input to the preterminals derived from the schema, wherein the model trainer is configured to train a statistical model corresponding to each of a plurality of different preterminals, wherein the model trainer receives the training data and enumerates segmentations of the training data to associate the slots and preterminals with the training data, wherein the model trainer is configured to train a statistical model for each preterminal derived from the schema using the text associated with each preterminal as training data for the statistical model for that preterminal.

2. The authoring component of claim 1 wherein the model trainer is configured to train a statistical slot transition model modeling transitions between slots.

3. The authoring component of claim 1 wherein the schema is indicative of tasks and wherein the model trainer is configured to train a statistical task model modeling a prior probability of tasks.

4. The authoring component of claim 1 wherein the model trainer is configured to assign an expected count to each segmentation enumerated.

5. The authoring component of claim 4 wherein the model trainer is configured to select a preterminal and train the statistical model for the selected preterminal using the expected count assigned to a segmentation corresponding to the selected preterminal.

6. The authoring component of claim 4 wherein the model trainer is configured to assign the expected count to each segmentation generated based on application of an expectation maximization (EM) algorithm.

7. The authoring component of claim 1 and further comprising:
a probabilistic library grammar accessible by the model trainer.

8. The authoring component of claim 7 wherein the training data is semantically annotated training data and wherein the model trainer is configured to adapt probabilities in the probabilistic library grammar based on the semantically annotated training data.

9. The authoring component of claim 1, wherein the slots derived from the schema are configured to be filled with terms from the natural language input that represent a task to be completed using the rules based grammar, and wherein the preterminals derived from the schema comprise at least one of preambles associated with the slots, postambles associated with the slots, and commands associated with the schema that are configured to be filled with terms from the natural language input using the plurality of statistical models, and wherein only the rules based grammar of the plurality of statistical models and rules based grammar is used to map terms from the natural language input to the slots, and wherein only the plurality of statistical models of the plurality of statistical models and rules based grammar is used to map terms from the natural language input to the preterminals.

10. A computer-implemented method of training a natural language understanding (NLU) model, comprising:
obtaining a schema indicative of a task to be completed, the schema including a plurality of slots and a plurality of preterminals, wherein each of the plurality of slots is configured to be filled with terms from a natural language input that are associated with the task, and wherein each of the preterminals comprises at least one of a preamble and postamble associated with one or more of the slots, the preterminals being configured to be filled with portions of the natural language input;
generating a plurality of segmentations of training data, for the plurality of slots and the plurality of preterminals from the schema, wherein generating a plurality of segmentations comprises associating one or more of the slots and one or more of the preterminals with portions of the training data;
training a plurality of statistical models using a processor for selected preterminals of the plurality of preterminals corresponding to at least one of the segmentations, wherein the plurality of statistical models are configured to map terms from the natural language input to the selected preterminals, wherein training the plurality of statistical models comprises generating a statistical model for each of the plurality of selected preterminals comprising:
selecting a first preterminal;
generating a first statistical model for the selected first preterminal using the portion of the training data associated with the selected first preterminal as training data for the first statistical model;
selecting a second preterminal; and
generating a second statistical model for the selected second preterminal using the portion of the training data associated with the selected second preterminal as training data for the second statistical model; and
training a rules based grammar using a processor for a selected slot of the plurality of slots corresponding to at least one of the segmentations, wherein the rules based grammar is configured to be used to map terms from the natural language input to the selected slot.

11. The method of claim 10 and further comprising:
receiving the training data as a schema and semantically annotated training text.

12. The method of claim 11 wherein generating a plurality of segmentations comprises:
assigning a count to each segmentation based on occurrences of the segmentation supported by the training data.

13. The method of claim 12 wherein assigning a count to each segmentation comprises:
assigning an expected count to each segmentation by application of an expectation maximization (EM) algorithm during generation of the segmentation.

14. The method of claim 10 wherein training a statistical model comprises:
training a statistical slot transition model modeling transitions between slots.

15. The method of claim 10 wherein the NLU system is represented by a schema that includes tasks and wherein training the statistical model comprises:
training a statistical task model modeling a prior probability of the tasks.

16. The method of claim 10 wherein the training data comprises semantically annotated training data and further comprising:
accessing a probabilistic library grammar; and
adapting probabilities in the probabilistic library grammar based on the semantically annotated training data.

17. The method of claim 10, and further comprising using the rules based grammar and the plurality of statistical models to map terms from the natural language input to the slots and the preterminals of the schema, wherein using comprises:
using only one of the statistical model and the rules based grammar to map terms from the natural language input to the slots of the schema; and
using only one of the statistical model and the rules based grammar to map terms from the natural language input to the preterminals of the schema, wherein the rules based grammar is utilized to map terms from the natural language input to the slots and the statistical model is utilized to map terms from the natural language input to the preterminals.

18. The method of claim 10, wherein generating a statistical model for each of the plurality of selected preterminals comprises:
selecting a second preterminal; and
generating a second statistical model for the selected second preterminal using the portion of the training data associated with the selected second preterminal as training data for the second statistical model.

19. A computer-implemented method of training a natural language understanding (NLU) model, the method comprising:
generating a plurality of segmentations of training data, for a plurality of slots and a plurality of preterminals derived from a schema;
training a statistical model using a processor of the computer for mapping a portion of a natural language input to a preterminal corresponding to at least one of the segmentations; and
training a statistical task model using the processor modeling a prior probabability of tasks derived from the schema;
wherein generating a plurality of segmentations comprises associating slots and preterminals with portions of the training data and wherein training a statistical model comprises generating a statistical model for each of the plurality of preterminals, wherein generating a statistical model for each of the plurality of preterminals comprises: selecting a preterminal; and generating a statistical model for the selected preterminal using the portion of the training data associated with the selected preterminal as training data for the statistical model.

20. The method of claim 19 wherein generating a plurality of segmentations comprises:
assigning a count to each segmentation based on occurrences of the segmentation supported by the training data.

21. The method of claim 20 wherein assigning a count to each segmentation comprises:
assigning an expected count to each segmentation by application of an expectation maximization (EM) algorithm during generation of the segmentation.

22. The method of claim 19 and further comprising:
training a statistical slot transition model modeling transitions between slots.

23. The method of claim 19 wherein the training data comprises semantically annotated training data and further comprising:
accessing a probabilistic library grammar; and
adapting probabilities in the probabilistic library grammar based on the semantically annotated training data.

24. The method of claim 19 and further comprising:
training a rules based grammar configured to map portions of the natural language input to the slots.

25. The method of claim 24, and further comprising using the rules based grammar and the statistical model to map terms from the natural language input to the slots and the preterminals derived from the schema, wherein using comprises:
using only one of the statistical model and the rules based grammar to map terms from the natural language input to the slots of the schema; and
using only one of the statistical model and the rules based grammar to map terms from the natural language input to the preterminals of the schema, wherein the rules based grammar is utilized to map terms from the natural language input to the slots and the statistical model is utilized to map terms from the natural language input to the preterminals.

* * * * *